(12) United States Patent
Plaster

(10) Patent No.: US 7,380,951 B2
(45) Date of Patent: Jun. 3, 2008

(54) DRIVER OBSERVATION SYSTEM AND METHOD THEREFOR

(76) Inventor: Morgan Plaster, 801 S. Rancho, Suite 74, Las Vegas, NV (US) 88106

( * ) Notice: Subject to any disclaimer, the term of this patent is extended or adjusted under 35 U.S.C. 154(b) by 127 days.

(21) Appl. No.: 11/398,139

(22) Filed: Apr. 4, 2006

(65) Prior Publication Data

US 2006/0181792 A1   Aug. 17, 2006

Related U.S. Application Data

(63) Continuation-in-part of application No. 10/856,484, filed on May 28, 2004, now Pat. No. 7,172,300, which is a continuation-in-part of application No. 10/704,898, filed on Nov. 10, 2003, now Pat. No. 6,935,758.

(51) Int. Cl.
*G02B 5/08* (2006.01)

(52) U.S. Cl. ..................................... 359/857

(58) Field of Classification Search ................ 359/857, 359/858, 838
See application file for complete search history.

(56) References Cited

U.S. PATENT DOCUMENTS 6,357,883 B1 * 3/2002 Strumolo et al. ........... 359/857

* cited by examiner

*Primary Examiner*—Euncha P Cherry
(74) *Attorney, Agent, or Firm*—Jeffrey D. Moy; Weiss & Moy, P.C.

(57) ABSTRACT

A driver observation system has a plurality of camera modules mounted to a vehicle. Each camera module provides real time video images. A control mechanism is coupled to the plurality of camera modules. The control mechanism is used to adjust a position of each camera module and to switch between different camera modules for viewing. A display system is coupled to the control mechanism. The display mechanism is used to show the real time video images from each camera module.

10 Claims, 3 Drawing Sheets

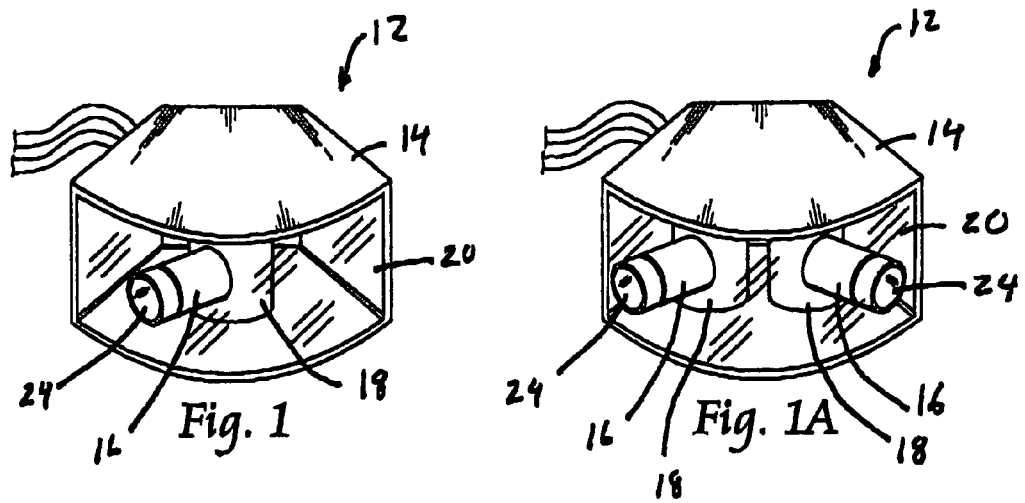
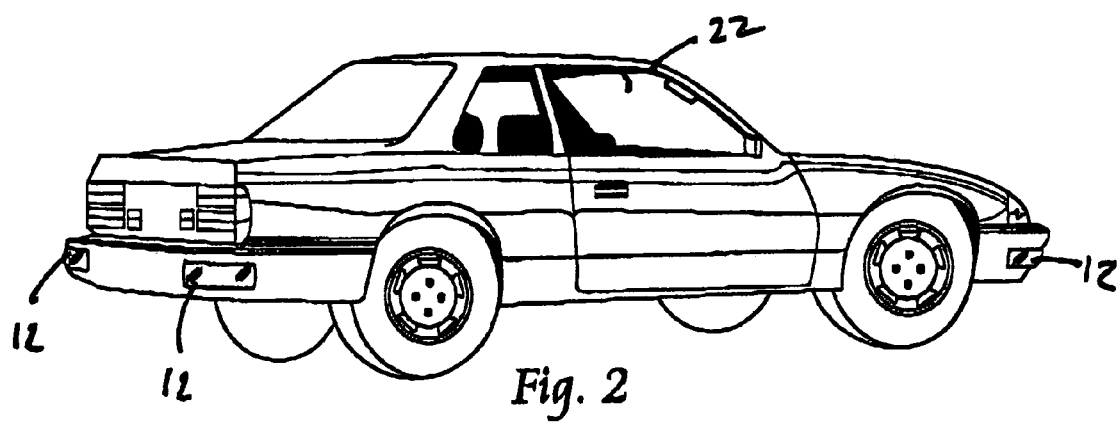
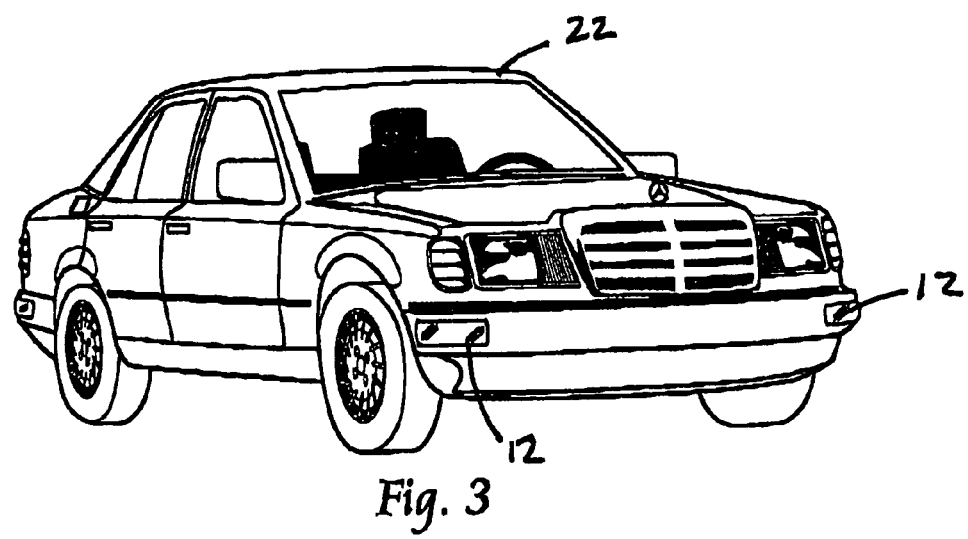

DRIVER OBSERVATION SYSTEM AND METHOD THEREFOR

RELATED APPLICATION

This application is a continuation-in-part of patent application Ser. No. 10/856,484, filed May 28, 2004 now U.S. Pat No. 7,172,300 in the name of Morgan Plaster and which is a continuation-in-part of U.S. application Ser. No. 10/704,898, filed Nov. 10, 2003, now U.S. Pat. No. 6,935,758, issued Aug. 30, 2005 in the same name as the present patent application. The above patent application is hereby incorporated by reference.

FIELD OF THE INVENTION

The present invention relates to automobiles, and more specifically, to devices, assemblies and systems for enhancing the observation of a driver of any vehicle by extending the driver's point of vision to the corners of the vehicle by transmitting forward, side, and rear images from the corners of the vehicle to a location within the vision of the driver at the controls of the vehicle.

BACKGROUND OF THE INVENTION

With the ever increasing number of vehicles on the roads, streets and highways and the increasing number of larger vehicles, such as pick-up trucks, vans and sports utility vehicles, commonly known as SUVs, the ability of the driver of a vehicle, especially smaller vehicles such as sports cars and sedans, to see traffic conditions, whether on the side, in the rear or forward has been diminished. This is particularly so in those conditions where a driver is attempting to turn into an intersecting street, or back out of a parking spot, or trying to turn left from a turning lane across oncoming traffic. In all those instances the driver must extend the vehicle into traffic a sufficient length, usually almost half the length of the vehicle, so that the driver's line of vision covers the oncoming traffic. While most vehicles are equipped with rear view mirrors and there have been attempts to eliminate the "blind spot" behind the driver, the need to extend the driver's line of vision applies in all directions.

Likewise, because so many vehicles are already in use, there is a need to provide an enhancement or extension of the driver's line of vision to existing vehicles as well as those under manufacture. Such an enhancement would have broader application and use if it were relatively small and unobtrusive.

Therefore, a need exists to provide a device and method to overcome the above problem. The device and method needs to increase the line of vision of the driver to extended to the corners of the vehicle.

SUMMARY OF THE INVENTION

In accordance with one embodiment of the present invention, it is an object of the present invention to provide a device and method that improves a driver's line of vision.

It is another object of the present invention to provide a device and method that extends the driver's line of vision in all directions.

It is still another object of the present invention to provide a device and method that increases the line of vision of the driver to extended to the corners of the vehicle.

BRIEF DESCRIPTION OF THE EMBODIMENTS

In accordance with one embodiment of the present invention, a driver observation system is disclosed. The driver observation system has a plurality of camera modules mounted to a vehicle. Each camera module provides real time video images. A control mechanism is coupled to the plurality of camera modules. The control mechanism is used to adjust a position of each camera module and to switch between different camera modules for viewing. A display system is coupled to the control mechanism. The display mechanism is used to show the real time video images from each camera module.

In accordance with another embodiment of the present invention, a driver observation system is disclosed. The driver observation system has a plurality of camera modules. The camera modules are mounted to a vehicle for providing real time video images. Each camera module has a housing. An opaque cover is coupled to a front area of the housing. At least one video camera is mounted in the housing. A movable platform is coupled to the at least one video camera. An adjustment circuit is coupled to the movable platform for moving a position of the movable platform. A control mechanism is coupled to the plurality of camera modules to adjust a position of each camera module and to switch between different camera modules for viewing. A display system is coupled to the control mechanism to show the real time video images from each camera module.

The foregoing and other objects, features, and advantages of the invention will be apparent from the following, more particular, descriptions of the preferred embodiments of the invention, as illustrated in the accompanying drawing.

BRIEF DESCRIPTION OF THE DRAWINGS

FIG. 1 is an elevated perspective view of one embodiment of the camera system used in the present invention;

FIG. 1A is an elevated perspective view of another embodiment of the camera system of the FIG. 2 is a side perspective view of a vehicle showing the locations of the camera system mounted thereon;

FIG. 3 is front perspective view of a vehicle showing the locations of the camera system mounted thereon;

Common reference numerals are used throughout the drawings and detailed description to indicate like elements.

DETAILED DESCRIPTION

Referring to the Figures, a driver observation system 10 is shown. The driver observation system 10 will provide an enhancement or extension of the driver's line of vision to existing vehicles as well as those under manufacture. The driver observation system 10 will increase the line of vision of the driver to extend to all corners of a vehicle.

Figure 6:
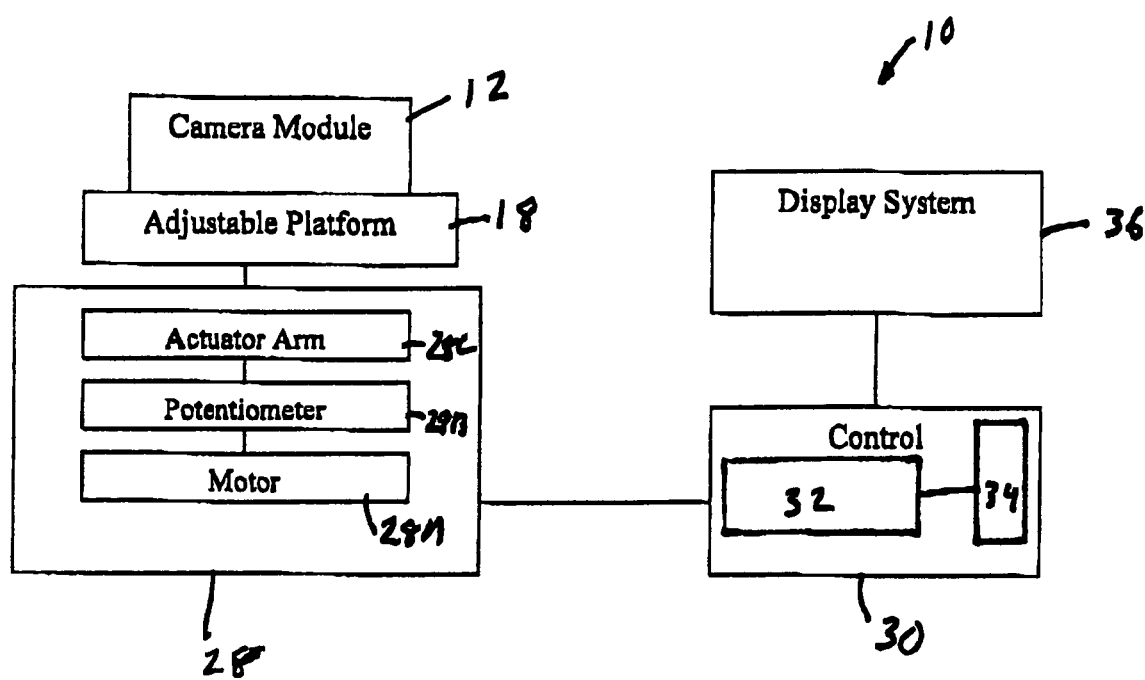
FIG. 6 is a simplified functional block diagram showing the driver observation system of the present invention.

As shown in FIG. 6, the driver observation system 10 is comprised of a plurality of camera modules 12. Each camera module 12 is coupled to a control mechanism 30. The control mechanism 30 will allow one to adjust the position and focus of each camera module 12 and to allow a person to switch between different camera modules 12 for viewing.

A display system 36 is coupled to the control mechanism. The display system 36 will allow a person to monitor the video feed from each camera module.

As shown in FIGS. 1-4, the driver observation system 10 has a plurality of camera modules 12. Each camera module 12 is mounted to the vehicle 22. The camera module 12 is generally mounted in the front and/or rear bumper of the vehicle 22. Preferably, the camera modules 12 are mounted on all four corners of the vehicle 22. For a more aerodynamic look, each camera module 12 is generally mounted inside the bumper of the vehicle 22 with the front face of the camera module 12 flush with the bumper. The above is given as an example. The camera module 12 may be mounted to other components and areas of the vehicle 22 without departing from the spirit and scope of the present invention. Each camera modules 12 will provide real time video images of an area in the direction of where the camera module 12 is pointed. By mounting multiple camera modules 12 around the vehicle 22 one will increase the line of vision of the driver to extend to different areas of the vehicle.

As shown in FIGS. 1 and 1A, each camera module 12 has a housing 14, one or more monitoring cameras 16, an adjustable platform 18, and a lens panel 20. Each camera module 12 has a housing 14. The housing 14 is generally made of a lightweight but sturdy material such as plastic, aluminum or the like. The listing of the above is given as an example and should not be seen as to limit the scope of the present invention. The housing 14 is used to protect the components in the camera module 12 from damage. The housing 14 shown in the FIGS. 1 and 1A is slightly conical in shape. However, the housing 14 may come in different shapes without departing from the spirit and scope of the present invention.

As stated above, in FIGS. 1 and 1A, the housing 14 is slightly conical in shape. The housing 14 has a rounded front section. The side walls 14A tapers down as the side walls moves towards the rear of the housing 14. The tapered shape of the housing 14 serves two purposes. First, the rounded front end allows the monitoring cameras 16 to have a wider viewing angle. This will allow a driver to have a larger viewing area. The tapered housing 14 further allows one to more easily install the driver observation system 10 in an existing vehicle 22. The tapered rear section of the housing 14 will allow the housing 14 to more easily be positioned inside an existing bumper of a vehicle 22.

The rounded front section of the housing 14 is covered by a lens panel 20. The lens panel 20 encloses the housing 14 to prevent damage to the components in the camera module. The lens panel 20 further reduces the glare from the sun and other light sources. The lens panel 20 may have a tint, coating, or the like to reduce the glare from different light sources.

Located inside each housing 14 are one or more monitoring cameras 16. The monitoring cameras 16 will provide real time video images of an area where the monitoring camera 16 is pointed. The monitoring camera 16 may have an adjustable lens 24 mounted thereon. The adjustable lens 24 will allow one to magnify or de-magnify (i.e., zoom in or zoom out) to get a clearer image of an area. Alternatively, a wide angle lens may be placed on the monitoring camera 16. A wide angle lens will generate a larger viewing area. Thus, a larger area can be monitored using a wide angle lens.

The monitoring camera 16 may be coupled to an adjustable platform 18. The adjustable platform 18 will allow one to move the monitoring camera 16 in any desired direction. Thus, one would be able to move the monitoring camera 16 in an up and down direction, a left or right direction, and the like. This will allow a user to view a larger area.

The adjustable platform 18 is generally coupled to a servo control device 28. The servo control device 28 will allow one to adjust the position of the adjustable base 26 to move the monitoring camera in a desired direction. Referring now to FIG. 6, the servo control device 28 is comprised of a motor 28A, a potentiometer 28B, and an actuator arm 28C. The actuator arm 28C is coupled to the adjustable platform 18. The actuator arm 28C is used to move the adjustable platform 18 in a desired direction. The actuator arm 28C is generally coupled to a potentiometer 28B. The potentiometer 28B is used to control movement of the actuator arm 28C. The potentiometer 28B is coupled to a motor 28A. The motor 28A moving the actuator arm 28C via the potentiometer 28B.

Each camera module 12 is coupled to a control mechanism 30. The control mechanism 30 has two main purposes. First, the control mechanism 30 allows one to adjust the position and focus of each monitoring camera 16. Second, the control mechanism 30 will allow a person to switch between different monitoring cameras 16. Thus, a driver can switch between the monitoring cameras 16 in the front of the vehicle 22 or the rear of the vehicle based on the direction the vehicle 22 is traveling.

Figure 4:
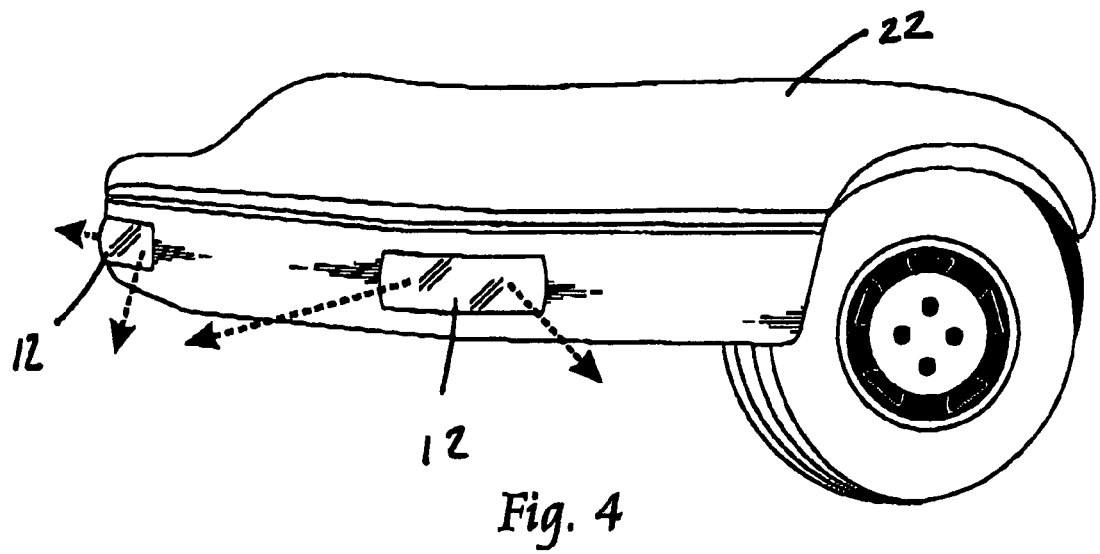
FIG. 4 is a magnified front view of the camera system used in the present invention mounted on the vehicle.
Figure 5:
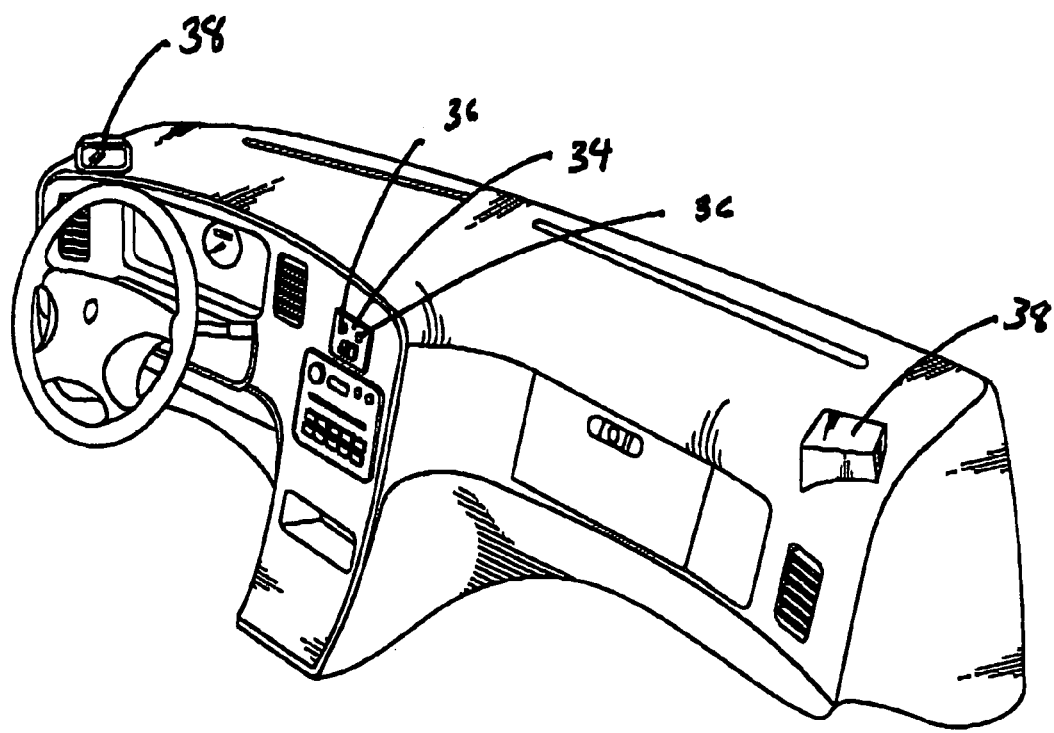
FIG. 5 is an elevated perspective view of the dashboard of the vehicle with a monitoring and control system used in the present invention.

As shown in FIGS. 5 and 6, the control mechanism 30 is comprised of a control circuit 32 and a control panel 34. The control panel 34 is generally mounted in the vehicle 22. As shown in FIG. 5, the control panel 34 has a plurality of input devices 36. The input devices 36 will allow one to control the operation of the monitoring camera 16 and the adjustable base 26. The input devices 36 will generally be buttons, switches, toggles switches, and the like. The listing of the above is given as examples and should not be seen as to limit the scope of the present invention. The input devices 36 allow one to adjust the position and focus of each monitoring camera 16 and will allow a person to switch between different monitoring cameras 16.

The input devices 36 are coupled to the control circuit 32. The control circuit 32 is generally comprised of a processor. The processor is programmed to allow one to adjust the position and focus of each monitoring camera 16 and will allow a person to switch between different monitoring cameras 16 through the use of the input devices.

The real time video images from each monitoring camera are shown on a display system 36. The display system 36 is generally mounted inside the vehicle 22 in which the driver observation system 10 is installed. In general, the display system 36 is generally comprised of one or more video monitors 38 which are mounted on the dash of the vehicle 22. A video monitor 38 is generally mounted on both the left and right side of the dashboard. The control mechanism 30 may allow one to control the images on the display system. For example, the video monitor 38 may be split to show images from all of the cameras. Alternatively, the video monitor 38 may just show images from one camera. The control mechanism 30 will then allow the user to toggle between different monitoring cameras 16 which will be displayed on the video monitor 38. In accordance with another embodiment, a pair of video monitors 38 may be installed in the vehicle 22. The video monitors 38 will generally be mounted on each side of the dashboard of the vehicle 22. In general, the video monitor 38 on the right side will display images from the front and back of the vehicle 22 on the driver's side, while video monitor 38 on the left side will display images from the front and back of the vehicle 22 on the passenger's side. As discussed above, the video monitors may be split to show images from all of the cameras. Alternatively, the video monitor 38 may just show images from one camera. The control mechanism 30 will then allow the user to toggle between different monitoring cameras 16 which will be displayed on the video monitor 38.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A driver observation system comprising:
    a plurality of camera modules mounted to a vehicle for providing real time video images, wherein each camera module comprises:
        a housing;
        an opague cover coupled to a front area of the housing;
        at least one video camera mounted in the housing;
        an adjustable lens coupled to the at least one video camera;
        a movable platform coupled to the at least one video camera; and
        an adjustment circuit coupled to the movable platform for moving a position of the movable platform;
    a control mechanism coupled to the plurality of camera modules to adjust a position of each video camera and a focus of the adjustable lens of each video camera and to switch between different video cameras for viewing; and
    a display system coupled to the control mechanism to show the real time video images from each camera module.

2. A driver observation system in accordance with claim 1 further comprising a wide angle lens coupled to the at least one video camera.

3. A driver observation system in accordance with claim 1 wherein each camera module further comprises a plurality of video cameras mounted in the housing.

4. A driver observation system in accordance with claim 1 wherein the adjustment circuit comprises:
    an actuator arm coupled to the movable platform;
    a potentiometer coupled to the actuator arm to control movement of the actuator arm; and
    a motor coupled to the potentiometer for moving the actuator arm.

5. A driver observation system in accordance with claim 1 wherein housing further comprises a tint applied to the lens cover to reduce glare from different light sources.

6. A driver observation system in accordance with claim 1 wherein the control mechanism comprises:
    a control panel mounted in the vehicle, the control panel having a plurality of input devices; and
    a control circuit coupled to the control panel to control operation of the camera modules and the display system.

7. A driver observation system in accordance with claim 1 wherein the display system comprises at least one display monitor.

8. A driver observation system comprising:
    video means coupled to a vehicle for providing real time video images;
    an adjustable lens coupled to the video means the control mechanism allowing one to adjust the adjustable lens;
    control means coupled to the video means to adjust a position of each video means, to magnify and de-magnify images captured by the video means, and to switch between different video means for viewing; and
    display means coupled to the control means for show the real time video images from each video means.

9. A driver observation system in accordance with claim 8 further comprising a wide angle lens coupled to the video means.

10. A driver observation system in accordance with claim 8 further comprising a tint applied to the video means to reduce glare from different light sources.

* * * * *